(No Model.)

B. F. STOCKFORD.
Iron Melting Furnace.

No. 230,356. Patented July 20, 1880.

Witnesses:

Inventor:
Benjamin F. Stockford

UNITED STATES PATENT OFFICE.

BENJAMIN F. STOCKFORD, OF SOUTH BEND, INDIANA.

IRON-MELTING FURNACE.

SPECIFICATION forming part of Letters Patent No. 230,356, dated July 20, 1880.

Application filed April 27, 1880. (No model.)

*To all whom it may concern:*

Be it known that I, BENJAMIN F. STOCKFORD, a citizen of the United States, residing at South Bend, in the county of St. Joseph and State of Indiana, have invented a new and useful Improvement in Iron-Melting Furnaces; and I do hereby declare that the following is a full, clear, and exact description thereof, reference being had to the accompanying drawings, forming a part of this specification, and the letters of reference marked thereon, in which—

Figure 1:
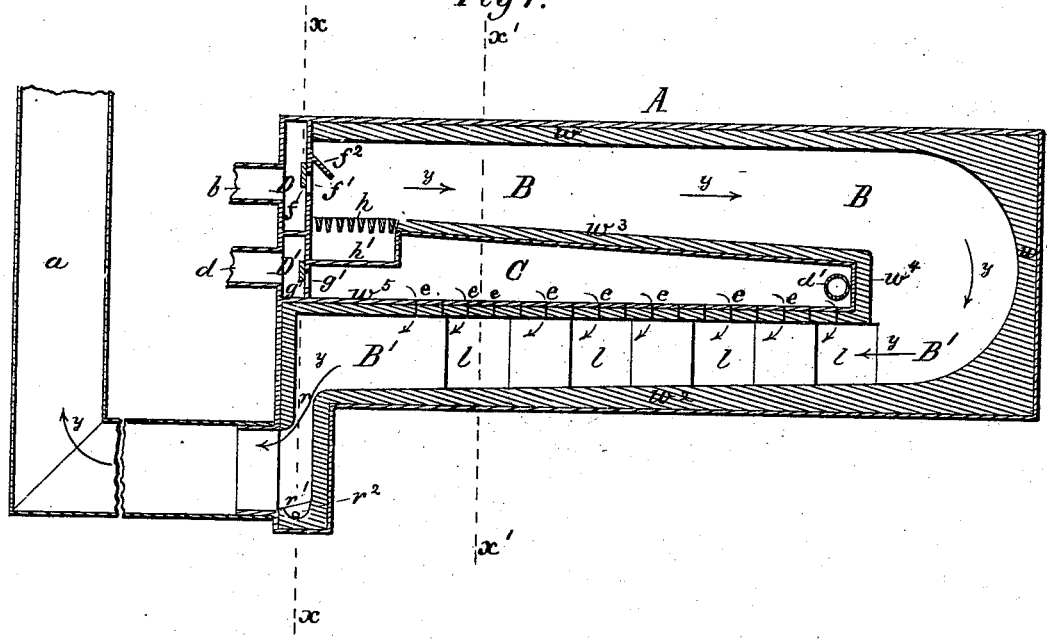
Figure 2:
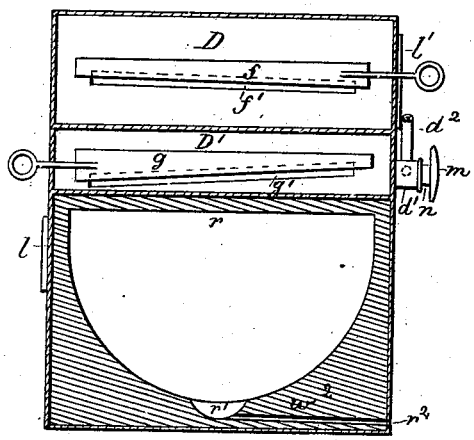
Figure 3:
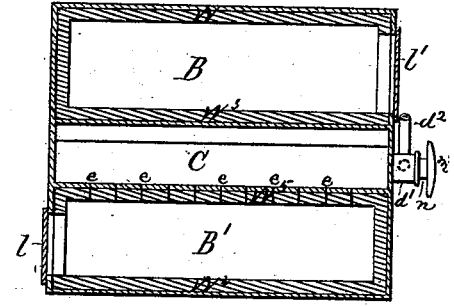

Figure 1 is a longitudinal central vertical section of my improved iron-furnace. Fig. 2 is a vertical section of the same on the line $x$ $x$ of Fig. 1, and Fig. 3 is a vertical section on the line $x'$ $x'$ of Fig. 1.

Heretofore furnaces for heating or melting bars of iron have been constructed with a fire-grate for the fuel at one end of the structure and with the escape-pipe or chimney for the products of combustion at the opposite end, and with only a single bed upon which to place the bars of iron to be heated or melted. In such structures the flame and heat from the incandescent fuel upon the fire-grate passes directly over the single bed, and thence immediately into the chimney, thereby causing a great waste of heat and an unnecessary consumption of fuel to effect the melting or heating of a given amount of iron.

The object of my invention is the production of a furnace for heating or melting iron which shall so economize the heat of the burning fuel that a greater quantity of iron can be either heated or melted by a given amount of fuel than has heretofore been effected, thereby greatly reducing the cost of "running" such structures; and this object I accomplish by the mechanism illustrated in the accompanying drawings, in which—

A indicates my improved furnace, constructed with inclosing-walls, as at $w$ $w'$ $w^2$, the fire-chambers B B' of which communicate with an exit-flue or smoke-stack, $a$, as shown in Fig. 1.

C is an auxiliary air-chamber extending longitudinally of the furnace, as shown, between the side walls thereof, the inclosing-walls of said chamber being signified at $w^3$ $w^4$ $w^5$. The upper wall, $w^3$, of the air-chamber C serves as a floor, upon which bars of iron to be either heated or melted are placed crosswise through doors $l'$, which open into the upper fire-chamber, B; and the interior surface of the wall $w^2$ of the furnace A serves as a floor, upon which bars of iron to be heated or melted are also placed in the fire-chamber B' through doors, as at $l$, said doors communicating with the respective fire-chambers at opposite sides of the furnace, as shown, in order that persons charging the furnace with iron to be heated or melted may not interfere with each other during such act.

The floor or wall $w^3$ of the fire-chamber B is made to incline downwardly toward the rear end, $w'$, of the furnace, while the interior or floor portion of the wall $w^2$ of the chamber B' inclines downwardly from the rear end, $w'$, of the furnace toward and to the throat $r$ of the furnace, such inclination serving to conduct molten iron into a gutter, $r'$, at the bottom of the throat $r$, whence it may be drawn off through a plug-hole, as at $r^2$, in case the bars of metal placed upon the floors of the fire-chambers are to be melted for casting purposes.

The fire-grate $h$, with an ash-pit, $h'$, is located at the forward end of the upper fire-chamber, B, and communication therewith for the supply of fuel is had through one of the side walls of the furnace.

D is an air-box, into which, through a tube, $b$, leading from a fan-blower, air is forced, and from which the air passes through an opening, $f'$, upon the fuel on the grate $h$, an air-deflector, as at $f^2$, serving to direct the blast of air upon the burning fuel, whence, with the flame and products of combustion, the blast of air passes over the bars of iron on the floors of the fire-chambers B B', on down through the throat $r$, and up out through the stack $a$, as indicated by the arrows $y$. This air-blast is regulated by a slide, $f$, the drawing out or pushing in of which enlarges or diminishes the aperture $f'$.

D' is also an air-box, into which a blast of air from a fan-blower is forced through the tube $d$, and whence through an aperture, as at $g'$, covered more or less, as desired, by a slide, as at $g$, the blast passes in the air-chamber C. Through the bottom or wall $w^5$ of this chamber perforations, as at $e$, are made nearly from end to end and from side to side of said chamber, so that when the chamber is charged with air, currents will be forced through the apertures $e$ upon the flame and products of combustion passing through the fire-chamber B', and thus compel said flame and products of combustion to hug down upon the bars of metal placed upon the floor of the fire-chamber B' and impart the full heat of the flame and products of combustion to the bars, such currents of air also supplying the requisite oxygen to keep up and stimulate combustion. In this manner the blast of air passing from the air-box D through the chambers B and B', and carrying with it the flame and products of combustion of the coal or fuel upon the grate $h$, is passed over the bars of iron placed upon the floors of both fire-chambers, and although the chamber B' is much farther removed from the fire upon the grate $h$ than the chamber B, still great heat is kept up in the chamber B' by reason of the air-jets through the apertures $e$ acting upon the flame and products of combustion passing through the chamber B', as above stated.

The interior surface of the rear end or wall, $w'$, of my improved furnace I make in curved form, as shown, thereby to facilitate the passage of the flame and products of combustion into the lower chamber, B', as well as to give the same an inclination or tendency to hug down upon the bottom of the chamber B'.

At the rear end of the air-chamber C, I provide an air-tube, $d'$, into the end of which, on the outside of the furnace, I apply a short tube, $n$, through which an opening (shown in dotted lines) is made at will to register with an air-exit tube, $d^2$, so that the operator, by grasping a thumb-disk, $m$, on the tube $n$, may turn the tube $n$ within the tube $d'$ and let off air from the chamber C through the exit-tube $d^2$ when the pressure of the air in the chamber C is too great.

It is apparent that my improved furnace may be used for heating bars of iron either for the rolling-mill or for melting bars of iron for casting purposes, and that the fan-blowers used, but not shown in the drawings, may be connected with the pipes or tubes $b$ and $d$ in any proper manner, and that the interior surfaces of the furnace exposed to the action of the fire may be lined with fire-brick or other fire-resisting material; and, finally, that by my improved construction I produce a double-heating iron-furnace only using a single fire-grate.

I am aware that it is not new to supply air to a furnace at points beyond the fire-grate for the purpose of promoting combustion.

I also am aware that the circulating products of combustion have been utilized for secondary heating purposes at points beyond the one where the fire is first utilized for the main heating purpose.

I also am aware that two or more chambers have been connected with an irregular fire or flame flue.

My invention is an improvement on the furnaces heretofore employed, in that the horizontal bed of its top heating-chamber is made hollow, and is perforated to receive a blast of air and distribute it into the lower heating-chamber in the peculiar manner described and shown, while the upper chamber is supplied with air in the usual manner.

What I claim as my invention is—

A furnace having two chambers, B B', between its grate and stack, the upper one of said chambers being united to the lower one by a rear down flue, and the lower chamber being separated from the upper one from the front wall to the rear flue of the furnace by a hollow partition-wall, which is perforated to receive air and distribute the same into the lower chamber while the upper chamber is being supplied with air in the usual manner, substantially as and for the purpose described.

BENJAMIN F. STOCKFORD.

In presence of—
JOHN E. FISHER,
A. S. DUNBAR.